Patented Mar. 1, 1938

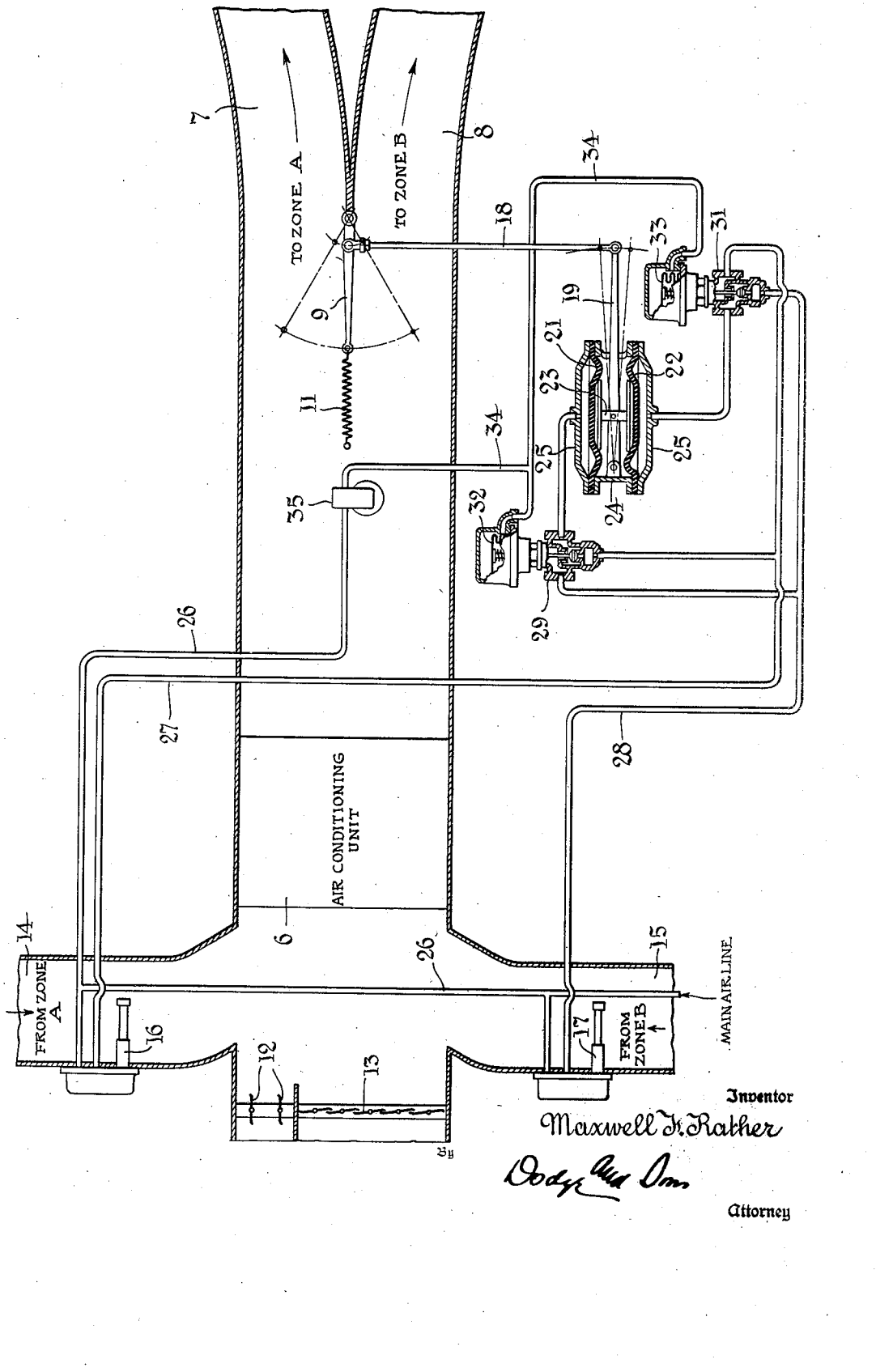

2,109,650

UNITED STATES PATENT OFFICE 2,109,650

CONTROL FOR AIR CONDITIONING SYSTEMS

Maxwell F. Rather, Cleveland, Ohio, assignor to Johnson Service Company, Milwaukee, Wis., a corporation of Wisconsin Application July 8, 1937, Serial No. 152,628

3 Claims. (Cl. 236—1)

This invention relates to air conditioning and particularly to systems where a single conditioner supplies conditioned air to two zones.

In installations of this type the demands made for conditioned air by the two zones vary relatively to one another from time to time so that in order to apply the output of the conditioner to best effect it is necessary to divide the output directed to the two zones in varying proportions.

One object of the present invention is to divide the output under the control of the differential in condition in the two zones. Temperature will be assumed as the controlling condition for purpose of explanation.

Modern year round conditioning systems operate reversely under winter and summer conditions. Generally stated they heat and humidify in winter and cool and dehumidify in summer. Where control is by regulating the flow of conditioned air to the two zones the control must be reversed for the two seasons. For example, if temperature differential be adopted as the controlling factor a fall of temperature would be corrected by an increase in the flow of conditioned air, whereas in summer a fall would be corrected by a decrease. This implies a reversal of the proportioning action. To meet this requirement the present invention provides for a reversal of the differential effect as between winter and summer conditions.

The present invention relates to a modified embodiment of the invention described and claimed in my copending application Serial No. 91,247, filed July 17, 1936, and so contrived that the temperature of the output of the conditioner as it passes above and below a chosen value, lower than the heating temperature and higher than the cooling temperature, effects the reversal of proportioning.

It should be observed that this invention is not concerned with control of the total performance of the conditioner, but rather with proportioning the total output between zones or points of use. Hence to simplify the description it will be assumed that the conditioner has a constant output, though that condition is not essential. In other words the invention does not inhibit the use of means to regulate the total performance of the conditioner, but is not directly concerned with such means.

A practical embodiment of the invention will now be described in connection with the accompanying drawing, whose single figure is a diagrammatic plan view, largely in section, showing the control applied to a single, year-round conditioner serving two zones. The system is shown operating under winter (heating) conditions.

The device 6 represents conditioning means for heating (and if desired humidifying) air passing through it in winter, and for cooling and dehumidifying air passing through it in summer. Its construction and mode of operation are immaterial so long as it has these alternative functions. A circulating fan is normally included in such a conditioner but is not illustrated as a distinct element.

A branch 7 delivers conditioned air to one zone A and a branch 8 delivers conditioned air to the other zone B. A splitter damper 9 urged to its neutral or mid-position by spring 11 may be shifted to vary the relative proportions sent to zone A and zone B of the total conditioned air available.

Manually adjustable louver dampers 12 control the amount of fresh air drawn into the conditioner. Other manually operable dampers 13 are closed when the conditioner is operating, but may be open when the system operates merely to ventilate and the conditioner is out of action.

A return duct 14 leads back to conditioner 6 from zone A and a return duct 15 from zone B. Mounted in these ducts are intermediate acting (sometimes called progressively acting) pneumatic thermostats 16 and 17. These thermostats sense the temperature in the respective zones, and location on the return ducts is well recognized in the art as the approximate equivalent of location in the zone itself.

The damper 9 is actuated through link 18 and lever 19 by two opposed diaphragm motors whose diaphragms appear at 21 and 22. The diaphragms operate through a thrust member 23 pivoted to lever 19. They are sustained by housing 24 to which lever 19 is pivoted and their working spaces are enclosed by caps 25.

The thermostats 16 and 17 receive air through supply line 26 and in response to similar variations of temperature establish similarly varying pressures in their branch lines 27 and 28. Each branch line 27 and 28 is connected to two three-way valves 29 and 31 of the double-beat poppet type. Valve 29 is shiftable to connect lines 27 and 28 selectively with the working space of diaphragm 21 while valve 31 is shiftable to connect them selectively with the working space of diaphragm 22.

The valves 29 and 31 are operated in unison by motors 32 and 33 connected to line 34. The connections to valves 29 and 31 are such that when line 27 is connected to the working space of diaphragm 22 line 28 is connected to the working space of diaphragm 21, and vice versa.

Line 34 is the branch line of a thermostat 35 (preferably positive acting) of the pneumatic type fed with air by a branch of line 26. This thermostat is subject to the temperature of air flowing from conditioner 6, and its control point is below the conditioner discharge temperature for winter operation (usually about 110°) and above the conditioner discharge temperature for summer operation (usually about 50°). A satisfactory control point is thus about 70°.

Assuming that thermostats 16 and 17 are of the progressive type and that each establishes increasing branch line pressure in response to rising temperature, thermostat 35 should put line 34 under pressure above the control point (70°) and vent line 34 below such control point.

The operation of the system above outlined is as follows:

If the system is operating under winter condition, at which time the conditioning unit would be furnishing heated air, the damper 9 will operate to divert more air to whichever of the zones is at the lower temperature and send equal quantities of air to the two zones if they are at the same temperature.

On the other hand, if the system is operating under summer conditions the operation of the damper will be exactly the reverse of that just described, that is it would send more air to whichever of the two zones is at the higher temperature. It will be observed that the two thermostats 16 and 17 operate as a differential thermostatic controller responsive to the temperature difference between the two zones.

Various other differential thermostatic arrangements might be evolved, and they fall within the broad scope of the invention. Some of these could follow alternative structure suggested in my copending application above identified.

What is claimed is,—

1. The combination of conditioning means operable selectively to supply heated air or cooled air to two zones; means for varying the relative proportions of the total supply of conditioned air delivered to the respective zones; means responsive to the differential between atmospheric temperatures in said two zones for controlling said varying means; means for reversing the effect of said differential on said varying means; and means responsive to the temperature of conditioned air leaving said conditioning means and effective as such temperature passes above and below a chosen value to actuate reversely said reversing means.

2. The combination of conditioning means operable selectively to supply heated or cooled air to two zones; means for varying the relative proportions of the total conditioned air delivered to respective zones; pneumatic thermostats, one subject to the temperature in each zone and each serving to develop a pneumatic pressure which varies in relation to the temperature to which it responds; motor means arranged to actuate said varying means and responsive to the differential between said pressures; means for reversing the effect of said differential on said motor means; and means responsive to the temperature of conditioned air leaving said conditioning means and effective as such temperature passes above and below a chosen value to actuate reversely said reversing means.

3. The combination of conditioning means operable selectively to supply heated or cooled air to two zones; means for varying the relative proportions of the total conditioned air delivered to the respective zones; pneumatic thermostats, one subject to the temperature in each zone and each serving to develop a pneumatic pressure which varies in relation to the temperature to which it responds; motor means arranged to actuate said varying means and responsive to the differential between said pressures; a reversing valve mechanism for reversing the connections of said pneumatic thermostats with said motor means; a reversing motor for controlling said reversing valves, said motor setting said valves in one position when energized and in the other position when deenergized; and a thermostat responsive to the temperature of conditioned air leaving said conditioner and serving to energize and deenergize said motor selectively as said temperature passes a chosen value.

MAXWELL F. RATHER.